(Model.)
J. RATH.
BROOM HANGER.
No. 254,692. Patented Mar. 7, 1882.
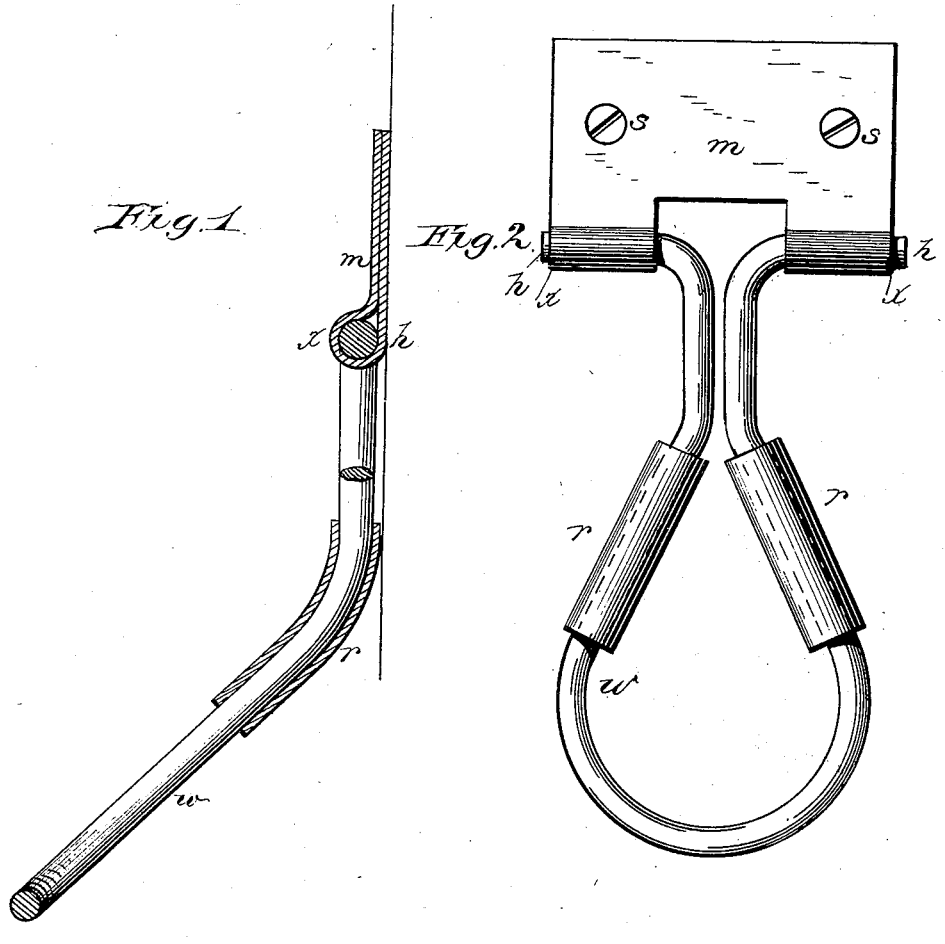
WITNESSES
Franck L. Ourand.
Jno. R. Young.
INVENTOR
Joseph Rath
by W. H. Doolittle
Attorney

UNITED STATES PATENT OFFICE.

JOSEPH RATH, OF COLUMBUS, OHIO.

BROOM-HANGER.

SPECIFICATION forming part of Letters Patent No. 254,692, dated March 7, 1882.

Application filed July 30, 1881. (Model.)

*To all whom it may concern:*

Be it known that I, JOSEPH RATH, a citizen of the United States, residing at Columbus, Franklin county, Ohio, have invented a new and useful Improvement in Broom-Hangers, of which the following is a specification, reference being made to the accompanying drawings, forming part thereof.

The object of my invention is to furnish a ready, convenient, and cheap device for suspending brooms, brushes, and other utensils. I attain these objects by the device illustrated in the accompanying drawings, in which—

Figure 1 represents a side view of a section of my device; Fig. 2, a front view of my device; Fig. 3, a section of the loop $w$ at $r$.

Similar letters of reference are used to represent the same parts throughout.

$m$ represents a tin or metal plate forming half of a strap-hinge, which is attached to the wall by screws $s\ s$ or other device. I preferably form this hinge flat on the back, so that it can rest flat against the wall with the eyes $x\ x$ formed on the side opposite from the wall. $w$ represents a wire loop with an oval-shaped opening large enough to receive the handle of the utensil to be suspended, the ends of this wire forming the ears $h\ h$, which enter the eyes $x\ x$ of the hinge $m$. The lower end or opening of the loop when suspended is bent outwardly, as represented in Fig. 1, at an angle sufficient to readily allow the handle of the utensil to pass upwardly through the opening of the loop. On this wire loop I place a rubber tube on each branch of the loop, near the upper end of the opening, as $r\ r$, Fig. 2, to assist in holding the utensil suspended. I do not limit myself to the rubber tubing, for many other shapes and modes of applying the rubber will readily suggest themselves. For instance, the entire loop may be covered with rubber, the rubber applied may be a half-tube and various other forms. The support thus formed when attached to the wall is operated by passing the handle of the utensil to be suspended up through the opening in the loop $w$, and as the loop is bent outwardly the handle of the utensil cannot hang exactly vertical, and the effort to attain an exact perpendicular will cause the handle to press against the loop and securely hold the broom or utensil suspended at any point on the handle where it comes in contact with the loop. The broom or utensil is removed by giving the handle a slight upward movement, and thus remove the pressure of the handle from the loop.

In my device there are no jaws, teeth, or biting-edges to scratch the varnish, deface and mark the handle, and the rubber can be dispensed with without destroying the utility of the device; but the rubber being soft and pliable I prefer to use the same.

I am aware that broom-hangers have been constructed with a downwardly and outwardly curved bail or loop forming an opening through which a utensil is inserted, and by which it is suspended by reason of its own weight; but

What I claim, and desire to secure by Letters Patent, is—

The broom-holder herein described, consisting of the combination of a metal hinge, $m$, having a flat back, provided with eyes formed on the side opposite to the wall, with the wire loop $w$, having an oval-shaped opening to receive the handle of the utensil to be suspended, and bent outwardly, as shown, and also having ears $h\ h$, which enter the eyes of the said metal hinge, substantially as set forth.

JOSEPH RATH.

Witnesses:
   JOHN F. MCFADDEN,
   GEORGE E. MCFADDEN.